3,413,375
PROCESS OF THE MANUFACTURE OF BUTINE-2
Kurt Sennewald and Wilhelm Vogt, Knapsack, near Cologne, and Herbert Baader, Hermulheim, near Cologne, Germany, assignors to Knapsack Aktiengesellschaft, Knapsack, near Cologne, Germany, a corporation of Germany
No Drawing. Filed Apr. 2, 1965, Ser. No. 445,268
Claims priority, application Germany, Apr. 10, 1964, K 52,635
12 Claims. (Cl. 260—678)

ABSTRACT OF THE DISCLOSURE

A process for producing butine-2 by catalytic dehydrohalogenation of a feed consisting essentially of 2-chlorobutene-2 by subjecting to 200–600° C. in the presence of an oxide or chloride of potassium, copper, beryllium, magnesium, calcium, strontium, barium, zinc, cadmium, aluminum, cerium, lead, tin, chromium, manganese, iron, cobalt and nickel.

---

The present invention is concerned with a process for manufacture of butine-2 by separating hydrogen chloride from 2-chlorobutene-2 by catalytic means at high temperatures.

It is known that butine-2 can be prepared on a laboratory scale by subjecting 2,3-dibromobutane or 2-bromobutene-2 to a cleavage reaction so as to separate hydrogen bromide therefrom with the aid of potash lye or sodium alcoholate. Butine can also be prepared by methylating an alkali metal compound of acetylene or propine with dimethylsulfate or methyl-iodide. These two processes did not gain commercial interest because the agents necessary to separate hydrogen bromide and the above alkylating agents are too expensive, and because the compounds obtained as by-products cannot commercially be utilized.

Attempts have also been made to prepare butine-2 by causing calcium carbide to react with methanol at a temperature of 60–200° C. under pressure, but this reaction requires a reaction time as long as 3 to 6 days to give butine-2 in a yield of 50 to 60%.

In view of the fact that butine-2 is a valuable feed product for numerous synthesis, e.g., for the preparation of hexamethylbenzene or tetramethylhydroquinone and the like, it proved necessary to develop a commercially useful and satisfactory process for making butine-2.

The present invention now provides a process for the continuous manufacture of butine-2 which comprises separating hydrogen chloride by catalytic means from 2-chlorobutene-2 at high temperatures with the resultant formation of butine-2 in an average yield of 85%, related to the 2-chlorobutene-2 which undergoes reaction.

It is an unexpected result that butine-2 can be produced in the manner described above since the 2-chlorobutene-2 used as the feed product is known to gradually decompose under normal conditions into undefined products accompanied by evolution of hydrogen chloride. Furthermore, it is known (cf. British Specification No. 855,559) that chlorobutenes can be transformed into butadiene by thermal treatment at a temperature of 450 to 750° C. in the absence of any catalyst. The process of the present invention yielding essentially butine-2 in addition to traces of butadiene must therefore be deemed to incur an unexpected and surprising result.

The process of the present invention comprises more especially subjecting 2-chlorobutene-2 to a cleavage reaction to separate hydrogen chloride therefrom at a temperature within the range of about 200 to about 600° C. with the aid of a catalyst consisting of an oxide or chloride of the elements comprising potassium, copper, beryllium, magnesium, calcium, strontium, barium, zinc, cadmium, aluminum, cerium, lead, tin, chromium, manganese, iron, cobalt or nickel, and distilling, if desired after condensation, resulting vaporous reaction product to separate butine-2 therefrom.

An advantageous variant of the present process comprises causing 2-chlorobutene-2 in liquid or vapor form to flow over the catalyst heated to the necessary reaction temperature, which may be used in lump, grain or powder form or may be applied to the surface of a carrier.

Suitable carriers include, e.g., pumice, glass bulbs, active carbon or small magnesia rods. Magnesium chloride applied onto pumice is an especially suitable catalyst because in this combination the carrier alone displays convenient catalytic activity. In other words, the good activity of this catalyst is the result of a combination effect. In carrying out the process of the present invention, the catalytically active substance is conveniently charged into a suitable reaction tube, which is heated to the necessary reaction temperature, and the feed product in vapor or liquid form is caused to flow therethrough at a rate adapted to the dimensions of the tube. The feed product should be allowed to remain in the tube for about 1–25 seconds. For example, a quartz or stainless steel tube may serve as the reaction tube. When a carrier is employed, the catalyst is prepared in conventional manner, i.e., by impregnating the carrier with an aqueous or methanolic solution of catalytic substance and subsequently evaporating the solvent. The catalyst should be applied onto surface area of the carrier in a concentration of about 1 to 20 weight percent, preferably about 15 weight percent.

As already mentioned above, it is also possible to use a solid or molten catalyst, i.e., without any carrier. In this latter case, the feed product is directly introduced into the molten catalyst. The hydrogen chloride should conveniently be separated irrespective of catalyst nature and form at a temperature of about 400–550° C.

Vaporous reaction product leaving the reaction chamber is generally worked up by first allowing the vapors to cool and liquefying desired butine-2 as well as unreacted 2-chlorobutene-2, and then subjecting the condensed matter to fractional distillation to separate butine-2 therefrom. Since hydrogen chloride is obtained as a by-product, which must also be separated, it is most advantageous to directly introduce the vaporous reaction mixture into water, wherein the hydrogen chloride is dissolved, and organic constituents are separated as a water insoluble phase. It is also possible to condense the hot vapors of the reaction mixture by introducing them into 2-chlorobutene-2 cooled at about −90° C. with the organic constituents together with a minor proportion of hydrogen chloride being dissolved in the condensing agent. The dissolved hydrogen chloride is expelled by heating the solution and butine-2 is isolated by fractional distillation. Cooling at −90° C. causes the butine-2 to crystallize when the butine content is above 50%, which means that solid and especially pure butine-2 can be separated.. Finally, the vaporous reaction product can also be worked up by directly distilling with no prior condensation.

Deposition of soot on the surface area of the catalyst which diminishes the activity of the catalyst is unavoidable and it is therefore necessary to regenerate the catalyst in certain intervals of time. To this end, air and/or oxygen is caused to flow over the hot catalyst to burn off any soot constituents. Mixing the air or the oxygen with the hydrogen chloride evolved in the present process permits using the same catalyst for the production of chlorine gas, which can be used for making feed product by reacting the said chlorine gas with butene-2 to give 2-chlorobutene-2.

The process of the present invention offers the advantage that butine-2 can be produced in continuous manner in commercial quantities with economic utilization of the by-products obtained, such as hydrogen chloride or butine-1.

EXAMPLE 1

100 grams liquid 2-chlorobutene-2 per hour were caused to flow through a quartz tube 60 cm. long and filled with 210 cc. of a catalyst consisting of 15 weight percent magnesium chloride and 85 weight percent pumice, and transformed therein at a temperature of 550° C. into butine-2 while splitting off hydrogen chloride. The feed product was allowed to stay for 15 seconds in the quartz tube. Hot vapors leaving the reactor were introduced into water, and depositing organic phase was separated and dried. Distillation of the organic phase gave 27.4 grams butine-2 and 3 grams butine-1. The balance consisted of unreacted 2-chlorobutene-2 and traces of butadiene. 55% of the 2-chlorobutene-2 used as the feed underwent conversion. Butine-2 was obtained in a yield of 85.5%, related to the 2-chlorobutene-2 which underwent conversion. 14.5% butine-1 were obtained concurrently therewith as a by-product.

EXAMPLE 2

The procedure was the same as that described in Example 1, but the catalyst consisted of 10 weight percent $MnCl_2$, applied onto pumice, 20.6 grams butine-2 and 2.5 grams butine-1 were obtained. The conversion rate was 46%, and the butine-2 yield amounted to 77% of the theoretical, related to the 2-chlorobutene-2 which underwent conversion.

EXAMPLE 3

The procedure was the same as that described in Example 1, but the catalyst consisted of 10 weight percent $FeCl_2$, applied onto pumice. The reactor temperature was at 400° C. 10.8 grams butine-2, corresponding to a butine-2 yield of 76% of the theoretical, were obtained for a conversion rate of 25%.

EXAMPLE 4

The procedure was the same as that described in Example 1, but the catalyst consisted of 10 weight percent $CdCl_2$, applied onto pumice. The reaction product contained 18.4 grams butine-2 and 2.3 grams butine-1. The conversion rate was 39%, and butine-2 was obtained in a yield of 82%, related to the conversion rate of the feed product.

EXAMPLE 5

10 weight percent CuCl, applied onto pumice, were used as the catalyst under conditions analogous to those used in Example 1. 6.8 grams butine-2 were obtained. The conversion rate was 16%, and butine-2 was obtained in a yield of 73.5% of the theoretical.

EXAMPLE 6

The oxides and chlorides of the elements comprising beryllium, calcium, barium, strontium, zinc, aluminum, cerium, lead, tin, chromium, cobalt and nickel were used as catalysts under the experimental conditions set forth in Example 1. The chlorides and oxides, respectively, had been applied onto pumice. Related to the 2-chlorobutene-2 which underwent conversion, butine-2 was obtained in yields varying between 20 and 80% of the theoretical for conversion rates varying between 5 and 40%.

EXAMPLE 7

The procedure was the same as that described in Example 1. Carbon and soot deposits on the catalyst were burned off by causing air or oxygen to flow from time to time through the reactor at a temperature of 500–600° C. A mixture of oxygen or air with HCl-gas for catalyst regeneration resulted in the concurrent formation of chlorine which could be used for making 2-chlorobutene-2. After regeneration of the catalyst, the initial yields as set forth in Example 1 were obtained again. The space/time yield was at least 100–130 grams butine-2 per liter catalyst per hour.

EXAMPLE 8

63 grams 2-chlorobutene-2 were introduced into the reactor in the manner described in Example 1. Reaction product leaving the reactor was introduced into 2-chlorobutene-2 cooled at −90° C., rather than scrubbed with water. HCl-gas was then essentially expelled by heating. The soution which remained was distilled to separate 10 grams butine. The yield was 73% of the theoretical for a conversion rate of 45%.

EXAMPLE 9

100 grams 2-chlorobutene-2 were evaporated per hour in a glass flask and the resulting gaseous product was introduced into a stainless steel reactor charged with a $MgCl_2$/pumice catalyst. The reactor was 60 cm. long and 28 mm. wide. The temperature in the reactor was at 500° C. Reaction product leaving the reactor was introduced into water for cooling and removing hydrogen chloride, the depositing organic phase was separated and distilled. It contained 14.2 grams butine-2 and 1.6 grams butine-1. The balance essentially consisted of unreacted 2-chlorobutene-2. The rate of conversion was 34%, and butine-2 was obtained in a yield of 72% of the theoretical, related to the 2-chlorobutene-2 which underwent reaction.

EXAMPLE 10

$MgCl_2$ applied onto glass bulbs 3 mm. in diameter, asbestos wool, active carbon and small magnesia rods, respectively, as the carrier was used as the catalyst under the experimental conditions set forth in Example 1. The activity of the catalysts tested is shown in the following table indicating conversion rates and yield.

| | Conversion rate, percent | Yield, percent |
| --- | --- | --- |
| Glass bulbs | 12.5 | 55 |
| Asbestos wool | 38 | 57.5 |
| Active carbon | 2 | 65 |
| Small magnesia rods | 33 | 44.5 |

EXAMPLE 11

Pumice as a catalyst was tested under the same experimental conditions as those set forth in Example 1 save that the temperature was maintained at 600° C. The pumice had not been impregnated with one of the above catalysts, but was composed of: 70% $SiO_2$; 13.7% $Al_2O_3$; 3.9% $K_2O$; 2.7% $Na_2O$; 3.2% $Fe_2O_3$; 1.5% CaO; and 0.5% MgO. (Loss on annealting: 3.8%). Butine-2 was obtained in a yield of 31%. Butine-1 was simultaneously obtained as a by-product at a rate of 35%, related to the 2-chlorobutene-2 which underwent conversion.

EXAMPLE 12

The reactor described in Example 1 was charged with solid, anhydrous $MgCl_2$-powder to serve as the catalyst and 95 grams 2-chlorobutene-2 were caused within 52 minutes to flow through the reactor at a temperature of 500° C. Resulting gaseous reaction product was condensed by being introduced into water, and the organic phase which deposited was separated, dried and distilled. It contained 11.8 grams butine-2, corresponding to a yield of 52% of the theoretical for a conversion rate of 52%.

EXAMPLE 13

95 grams 2-chlorobutene-2 were introduced within 55 minutes at 500° C. into a $ZnCl_2$-melt. Reaction product leaving the melt was mixed with steam having a temperature of 100° C. and then introduced into cold water. The organic phase was separated, dried and distilled. It contained 16.8 grams butine-2 and 3.5 grams butine-1. The conversion rate was 73.4%, and butine-2 was obtained in a yield of 39.5%.

We claim:

1. A process for preparing butine-2 by dehydrohalogenation of a feed consisting essentially of 2-chlorobutene-2, comprising subjecting the feed to a temperature of about 200–600° C. in the presence of a catalytic amount of the oxide or chloride of a metal selected from the group consisting of potassium, copper, beryllium, magnesium, calcium, strontium, barium, zinc, cadmium, aluminum, cerium, lead, tin, chromium, manganese, iron, cobalt and nickel; and recovering the resulting butine-2 product.

2. The process of claim 1 wherein the catalyst is an oxide or chloride of magnesium.

3. The process of claim 1 wherein the catalyst is an oxide or chloride of cadmium.

4. The process of claim 1 wherein the catalyst is an oxide or chloride of potassium.

5. The process of claim 1 wherein the catalyst is an oxide or chloride of tin.

6. The process of claim 1 wherein the metal chloride or oxide is used in lump form.

7. The process of claim 1 wherein the metal chloride or oxide is applied onto the surface of a carrier.

8. The process of claim 1 wherein the metal chloride or oxide is used in melt form.

9. The process of claim 7 wherein the carrier is a member selected from the group consisting of pumice, glass bulbs, active carbon and small magnesia rods.

10. The process of claim 1 wherein the reaction product is condensed by introducing it into water to absorb hydrogen chloride by-product and to recover butine-2 together with unreacted feed product as an organic phase.

11. The process of claim 1 wherein the metal chloride or oxide is applied onto the carrier in a concentration of about 1–20 weight percent.

12. The process of claim 1 wherein 2-halogeno-butene-2 resides in a reaction tube for about 1–20 seconds.

References Cited

UNITED STATES PATENTS

| 2,905,731 | 9/1959 | Seed | 260—679 |
| 2,985,695 | 5/1961 | Platz et al. | 260—679 |
| 3,268,611 | 8/1966 | Bajars | 260—680 |
| 3,274,285 | 9/1966 | Bajars | 260—680 |

DELBERT E. GANTZ, *Primary Examiner.*

J. D. Myers, *Assistant Examiner.*